US011214993B2

(12) United States Patent
Watanabe

(10) Patent No.: US 11,214,993 B2
(45) Date of Patent: *Jan. 4, 2022

(54) LATCH DEVICE

(71) Applicant: NIFCO INC., Yokosuka (JP)

(72) Inventor: Yasuhiro Watanabe, Yokosuka (JP)

(73) Assignee: NIFCO INC., Kanagawa (JP)

( * ) Notice: Subject to any disclaimer, the term of this patent is extended or adjusted under 35 U.S.C. 154(b) by 1372 days.

This patent is subject to a terminal disclaimer.

(21) Appl. No.: 15/110,330

(22) PCT Filed: Jan. 9, 2015

(86) PCT No.: PCT/JP2015/050555
§ 371 (c)(1),
(2) Date: Jul. 7, 2016

(87) PCT Pub. No.: WO2015/105193
PCT Pub. Date: Jul. 16, 2015

(65) Prior Publication Data
US 2016/0348408 A1 Dec. 1, 2016

(30) Foreign Application Priority Data
Jan. 10, 2014 (JP) .............................. JP2014-003481

(51) Int. Cl.
*B60K 15/05* (2006.01)
*E05B 83/34* (2014.01)
(Continued)

(52) U.S. Cl.
CPC .............. *E05B 83/34* (2013.01); *B60K 15/05* (2013.01); *E05B 85/02* (2013.01); *E05C 19/022* (2013.01);
(Continued)

(58) Field of Classification Search
CPC ........ E05B 83/34; E05B 85/02; E05C 19/028; E05C 19/022; B60K 15/05;
(Continued)

(56) References Cited

U.S. PATENT DOCUMENTS 8,485,585 B2 * 7/2013 Taniguchi ............... E05F 1/105
296/97.22
9,010,836 B2 * 4/2015 Watanabe ............. E05C 19/022
296/97.22
(Continued)

FOREIGN PATENT DOCUMENTS

CN 102802995 A 11/2012
JP 05-7407 2/1993
(Continued)

OTHER PUBLICATIONS

Korean Office Action dated Aug. 16, 2017 for corresponding KR Application No. 10-2016-7018553.
(Continued)

*Primary Examiner* — Kristina R Fulton
*Assistant Examiner* — Thomas L Neubauer
(74) *Attorney, Agent, or Firm* — Thomas|Horstemeyer, LLP

(57) ABSTRACT

A latch device includes a case, a rod juts out from inside the case so as to adopt an advanced position, a rod biasing member biases the rod in a jutting out direction pushing the rod out from inside the case, a lock mechanism that includes a slide cam that moves together with the rod in the jutting out direction and a rotation cam that is relatively rotatable with respect to the slide cam about an axis of the rod, with the lock mechanism locking the rod in a retracted position in the case due to the rotation cam engaging with the slide cam and rotating due to the rod being pressed in, a guide mechanism for rotating the rod about the axial direction thereof when the
(Continued)

rod is advancing or retracting, and an engagement portion that engages with an engaged portion when the rod has been locked.

12 Claims, 8 Drawing Sheets

(51) Int. Cl.
*E05B 85/02* (2014.01)
*E05C 19/02* (2006.01)

(52) U.S. Cl.
CPC ...... *E05C 19/028* (2013.01); *B60K 2015/053* (2013.01); *B60K 2015/0561* (2013.01); *B60K 2015/0576* (2013.01); *B60K 2015/0584* (2013.01)

(58) Field of Classification Search
CPC ...... B60K 2015/0561; B60K 2015/053; B60K 2015/0584; B60K 2015/0576
See application file for complete search history.

(56) References Cited

U.S. PATENT DOCUMENTS

| | | | |
|---|---|---|---|
| 9,493,967 B2 * | 11/2016 | Basavarajappa | E05B 83/34 |
| 9,982,467 B2 * | 5/2018 | Watanabe | E05B 83/34 |
| 10,683,685 B2 * | 6/2020 | Sonobe | E05C 19/022 |

FOREIGN PATENT DOCUMENTS

| | | |
|---|---|---|
| JP | 2011-256528 | 12/2011 |
| KR | 10-1260217 | 5/2013 |

OTHER PUBLICATIONS

Written Opinion of Application No. PCT/JP2015/050555 dated Mar. 24, 2015.
Chinese Office Action dated Mar. 2, 2017 for corresponding CN Application No. 2015800041324 (Partial English Abstract), pp. 1-10.

* cited by examiner

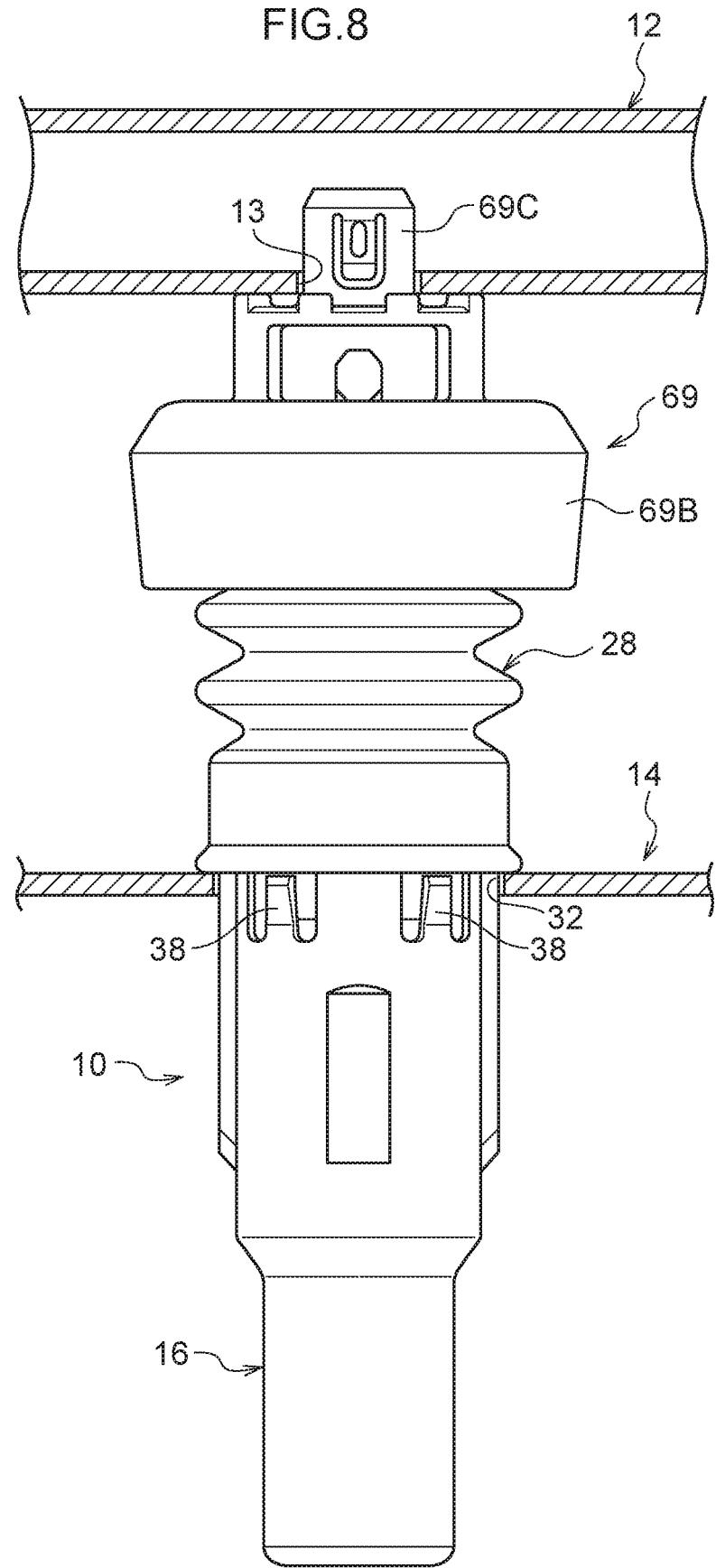

LATCH DEVICE

CROSS-REFERENCE TO RELATED APPLICATIONS

This application is the National Stage of International Application No. PCT/JP2015/050555, filed 9 Jan. 2015, having the title "LATCH DEVICE" which claims the benefit of and priority to Japanese Application No. 2014-003481, filed on 10 Jan. 2014, the contents of all of which are incorporated by reference as if fully set forth herein.

TECHNICAL FIELD

The present invention relates to a latch device for retaining a member, attached so as to be capable of opening and closing, in a closed position.

BACKGROUND ART

Hitherto, as an example of a latch device for retaining a member, attached so as to be capable of opening and closing, in a closed position, a device has been disclosed in Japanese Utility Model Application Laid-Open (JP-U) No. H5-7407. This conventional technology includes a tube shaped body, a sleeve that is housed inside the body and has a sleeve jutting out portion that is a portion jutting out from the body, a shaft having a portion housed inside the body and another portion configured as an anchor head that passes through the sleeve and juts out therefrom, and a shaft rotation means that rotates the shaft by a specific angle each time the sleeve jutting out portion is pressed in toward the inside of the body.

SUMMARY OF INVENTION

Technical Problem

However, in the device disclosed in JP-U No. H5-7407, biasing force (load) of a compression coil for anchoring a rotor (rotation cam), configuring a shaft rotation means, in an anchor groove, acts directly on the shaft. A high load accordingly acts on an increased diameter head of the shaft when disengaging from the groove of a dial cover by rotation. The durability of the latch device drops as a result.

In consideration of the above circumstances, an object of the present invention is to obtain a latch device that is able to prevent a drop in durability due to a high load.

Solution to Problem

A latch device of a first aspect of the present invention includes: a tube shaped case that is fixed at a side of a second member that faces a first member; a rod that is retained inside the case so as to be capable of sliding, and that juts out from inside the case to adopt an advanced position pushing out the first member; a rod biasing member that is positioned between the case and the rod, and that is compressed under elastic deformation inside the case, so as to bias the rod in a jutting out direction pushing the rod out from inside the case; a lock mechanism including: a slide cam that moves together with the rod in the jutting out direction, and a rotation cam that is provided at a rear side of the slide cam in the jutting out direction and that is capable of relative rotation with respect to the slide cam about an axis of the rod, with the lock mechanism positioned between the case and the rod, and locking the rod in a retracted position in the case due to the rotation cam engaging with the slide cam and rotating due to the rod being pressed in against a biasing force of the rod biasing member; a guide mechanism that is provided between the rod and the case, and is for rotating the rod about an axial direction of the rod when the rod is advancing or retracting; and an engagement portion that is provided at the rod, that is capable of disengaging from an engaged portion of the first member due to the rod rotating about the axial direction thereof, and that engages with the engaged portion when the rod has been locked.

In the latch device of the first aspect, the rod rotates about the axial direction thereof when the rod is advancing or retracting due to the guide mechanism provided at the rod and the case. The engagement portion provided at the rod disengages from the engaged portion of the first member by the rod rotating about the axial direction thereof. The rod biasing member, positioned between the tube shaped case fixed to the side of the second member that faces the first member, and the rod that is retained inside the case so as to be capable of sliding and that juts out from inside the case to adopt an advanced position pushing out the first member, is compressed by elastic deformation inside the case so as to bias the rod in the jutting out direction so as to push out from inside the case. When the rod is pressed in against biasing force of the rod biasing member, the rotation cam engages with the slide cam and rotates, such that the rod adopts a locked state in a retracted position due to the lock mechanism positioned between the case and the rod. In the locked state, the biasing force of the rod biasing member does not act directly on the engagement portion and the guide groove. As a result, a drop in the durability due to high load can be prevented.

The latch device of a second aspect of the present invention is the latch device of the first aspect, wherein the lock mechanism further includes: a jutting out portion that is positioned partway along an axial direction of the rod and that juts out in a radial direction toward an outer side; a lower-side rod section positioned at the rear side in the jutting out direction with the jutting out portion as a boundary, so as to be capable of sliding in the axial direction, the lower-side rod section supporting the slide cam, and supporting the rotation cam at the rear side of the slide cam in the jutting out direction such that the rotation cam is capable of rotating and capable of sliding in the axial direction, and the rotation cam meshing with the slide cam, and disengaging and being imparted with a rotation force in one direction by sliding of the rod; a slide groove that is positioned at one of an outer peripheral face of the slide cam or an inner peripheral face of the case, and that extends along a slide direction of the rod, a slide projection that is positioned at another of the outer peripheral face of the slide cam or the inner peripheral face of the case, and that prevents rotation of the slide cam with respect to the case due to relative sliding of the slide projection inside the slide groove due to sliding of the slide cam; an engagement projection that juts out from one of an outer peripheral face of the rotation cam or the inner peripheral face of the case; a lock groove that is positioned at another of the outer peripheral face of the rotation cam or the inner peripheral face of the case, that includes a lock portion into which the engagement projection fits, the engagement projection that has been fitted into the lock portion being capable of disengaging from the lock portion by the rotation cam rotating due to the rotation cam disengaging from the slide cam; a sleeve that is supported at a rear side of the rotation cam in the jutting out direction by the lower-side rod section so as to be capable of rotating and capable of sliding in the axial direction, and that is capable of abutting the rotation cam; and a grommet that is disposed at a rear side of the sleeve in the jutting out direction, that is inserted at the lower-side rod section, and that limits movement of the rod in the slide direction.

In the latch device of the second aspect, the lock mechanism is a rotation cam type lock mechanism configured by a jutting out portion, a slide cam, a rotation cam, a slide groove, a slide projection, an engagement projection, a lock groove, a sleeve, and a grommet. Switching between locking and unlocking is achieved by the rotation cam being operated by the rod being pressed in. Switching between locking and unlocking is accordingly reliably achieved.

The latch device of a third aspect of the present invention is the latch device of the first aspect or the second aspect, further comprising a boot that is provided between the engagement portion and the case, and that covers the rod.

In the latch device of the third aspect, foreign objects can be prevented from adhering to the guide groove due to the rod being covered by the boot provided between the engagement portion and the case.

A latch device of a fourth aspect of the present invention is the latch device of the third aspect, further including a slide resistance reduction member that is provided between the rod and the boot to reduce slide resistance between the rod and the boot.

In the latch device of the fourth aspect, the slide resistance between the rod and the boot is reduced due to the slide resistance reduction member provided between the rod and the boot. The rotatability of the rod with respect to the boot is improved as a result.

The latch device of a fifth aspect of the present invention is the latch device of any one of the first aspect to the fourth aspect, wherein the second member is a vehicle body, and the first member is a fuel lid attached to the vehicle body so as to be capable of rotating in opening and closing directions.

In the latch device of the fifth aspect, due to including the latch device of any one of the first aspect to the fourth aspect, the excellent operation and advantageous effects described above are exhibited in a fuel lid attached to a vehicle body so as to be capable of rotating in opening and closing directions.

Advantageous Effects of Invention

In the latch device of the first aspect of the present invention, due to configuration as described above, a drop in the durability of the latch device due to high load can be prevented.

In the latch device of the second aspect of the present invention, due to configuration as described above, a drop in the durability of the latch device due to high load can be prevented, and switching between locking and unlocking is reliably achieved.

In the latch device of the third aspect of the present invention, due to configuration as described above, foreign objects can be prevented from adhering to the guide groove.

In the latch device of the fourth aspect of the present invention, due to configuration as described above, the rotatability of the rod with respect to the boot can be improved.

In the latch device of the fifth aspect of the present invention, due to configuration as described above, a drop in durability due to high load acting on a fuel lid, attached to a vehicle body so as to be capable of rotating in opening and closing directions, can be prevented.

BRIEF DESCRIPTION OF DRAWINGS

FIG. 5 is an explanatory diagram corresponding to FIG. 4 and illustrating a state in which a rod has been pushed in.

FIG. 8 is a cross-section taken from the side and illustrating an attached state, to a vehicle body, of a latch device according to the first exemplary embodiment of the present invention.

DESCRIPTION OF EMBODIMENTS

Exemplary Embodiment

Explanation follows regarding an exemplary embodiment of a latch device of the present invention, with reference to FIG. 1 to FIG. 8.

Figure 2:
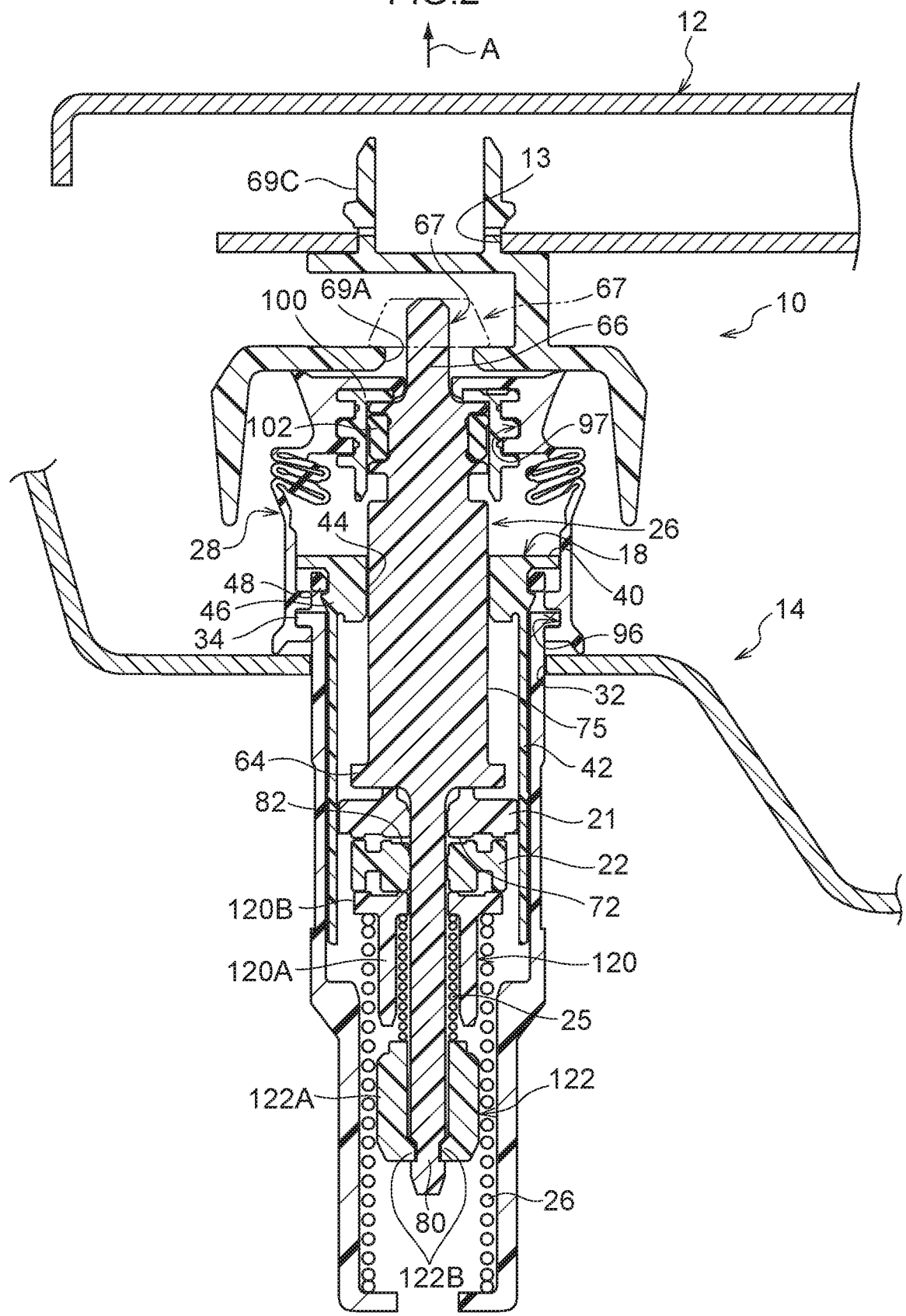
FIG. 2 is a cross-section taken from the side and illustrating a locked state of a latch device according to the first exemplary embodiment of the present invention.

As illustrated in FIG. 2, a latch device 10 of the present exemplary embodiment is provided, for example, on a vehicle body of a car, to a vehicle body inner panel 14, serving as a second member, facing a fuel lid 12, serving as a first member. The fuel lid 12 is attached to the inner panel 14 by a hinge, not illustrated in the drawings, so as to be capable of swinging in opening or closing directions, such that the fuel lid 12 is retained in the closed position illustrated in FIG. 2, or is pushed out in a jutting out direction (the arrow A direction in FIG. 2) that is the opening direction, by the latch device 10.

Figure 1:
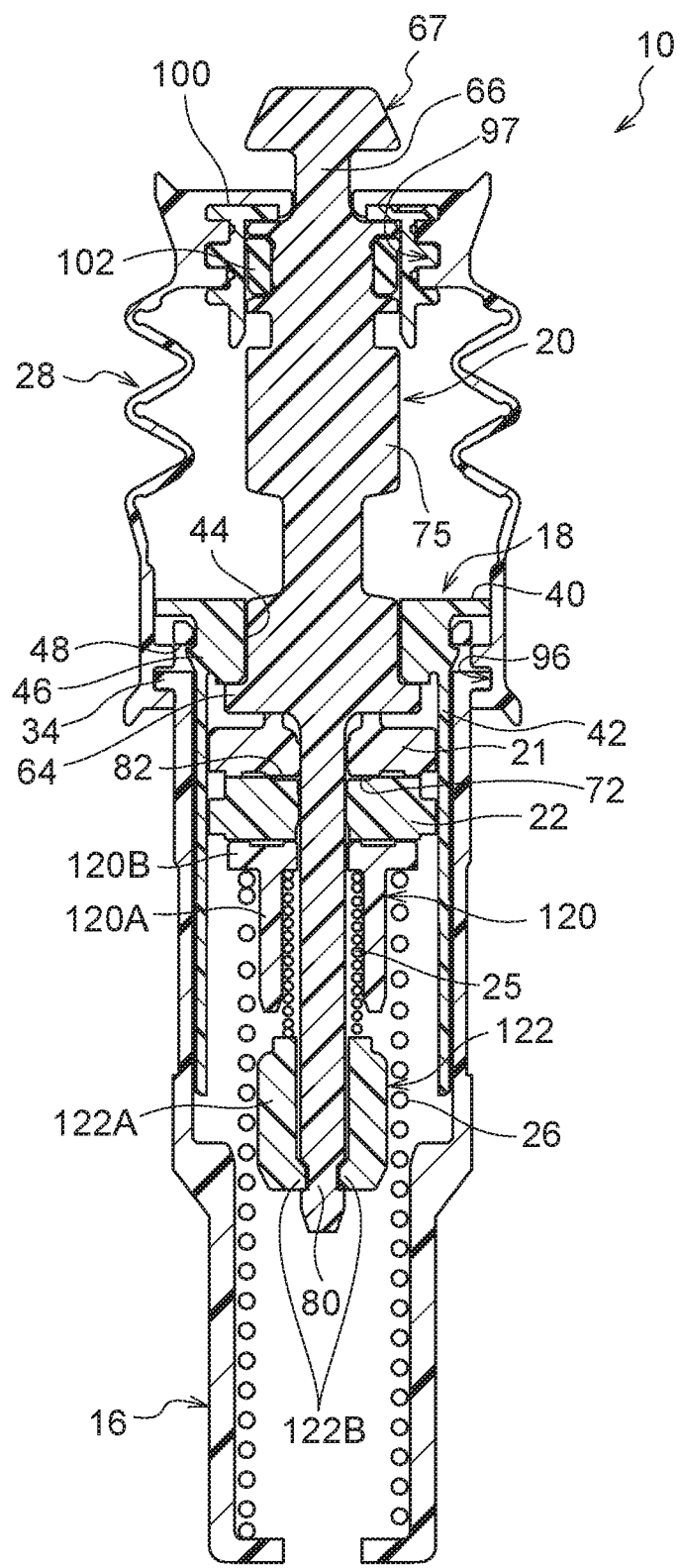
FIG. 1 is a cross-section taken from the side and illustrating a lock-released state of a latch device according to a first exemplary embodiment of the present invention.

As illustrated in FIG. 1, the latch device 10 includes a case 16, a rod 20, a jutting out portion 64 of the rod 20 serving as a lock mechanism, a cap 18, a slide cam 21, a rotation cam 22, a sleeve 120, a grommet 122, a first spring 25, a second spring 26 serving as a rod biasing member, and a boot 28. Note that the parts of the latch device 10 are not limited to the parts listed above. The first spring 25 and the second spring 26 are, as an example, configured by coiled springs, and the biasing force (load) of the first spring 25 is set smaller (lighter) than the biasing force (load) of the second spring 26.

Case

Figure 3:
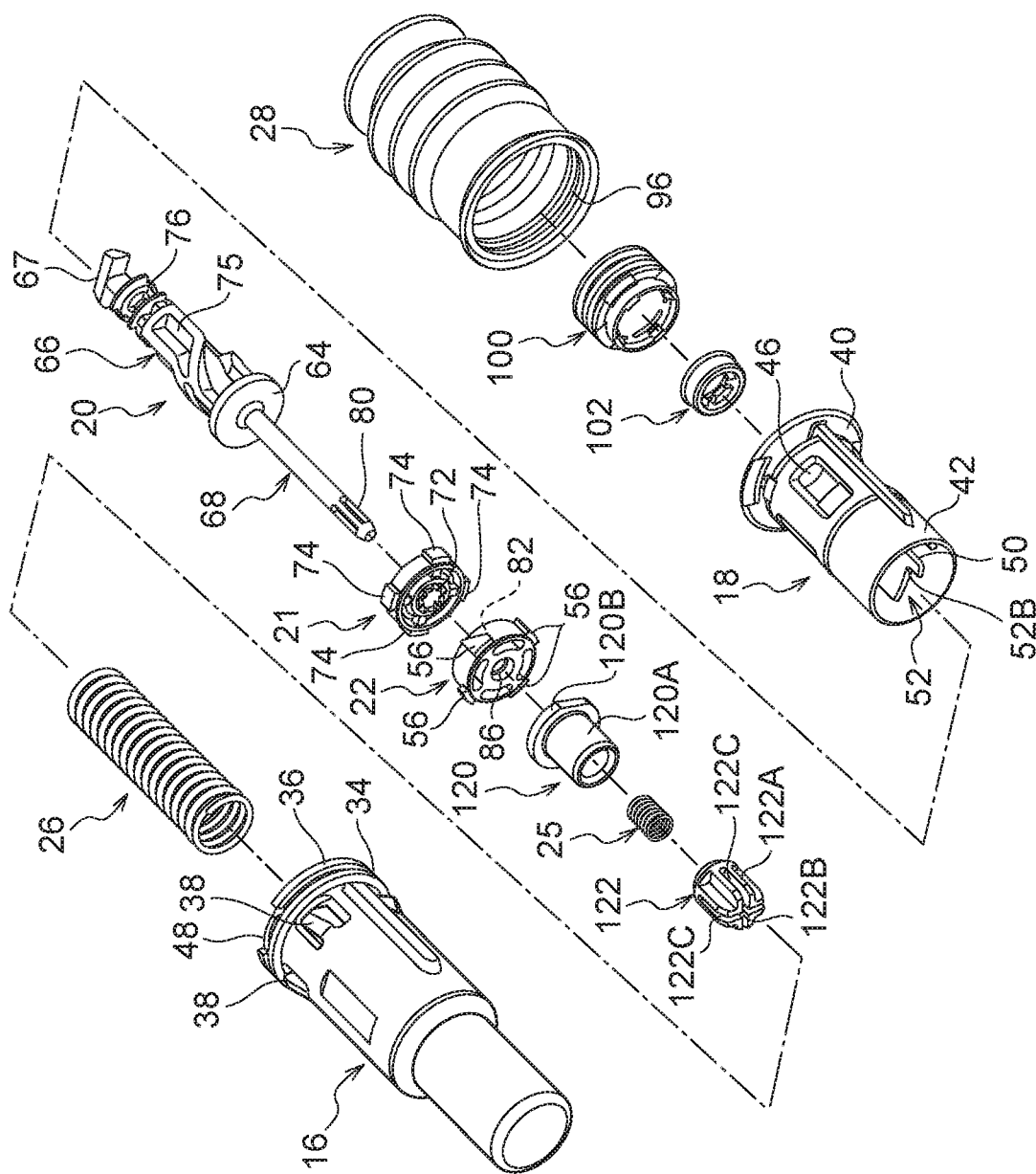
FIG. 3 is an exploded perspective view illustrating a latch device according to the first exemplary embodiment of the present invention.

As illustrated in FIG. 3, the case 16 is formed in a tube shape. As illustrated in FIG. 2, an attachment hole 32 is formed in the inner panel 14 so as to pierce through the front and back faces thereof, and the case 16 is fixed to the attachment hole 32.

As illustrated in FIG. 3, the case 16 is formed in circular cylinder shape that is open at the upper face and formed with a bottom face. The external diameter of the case 16 is set so as to be the internal diameter of the attachment hole 32 in the inner panel 14, or less. A flange 34 is formed to an end portion on the open side of the case 16 so as to extend in radial direction toward the outer side, and a ring shaped attachment portion 36 is formed at the upper side of the flange 34. Plural elastically deformable elastic claws 38 are formed at the lower side of the flange 34, jutting out in a radial pattern from the outer periphery of the case 16. These elastic claws 38 are provided at a distance from the lower face of the flange 34 so as to maintain a separation thereto of the plate thickness of the inner panel 14.

As illustrated in FIG. 2, when the case 16 is aligned with the attachment hole 32 and fitted therein, the elastic claws 38 are temporarily pushed in, and then elastically recover at the back face side of the inner panel 14, so as to sandwich the inner panel 14 between themselves and the lower face of the flange 34, thereby fixing the case 16 to the attachment hole 32.

Cap

As illustrated in FIG. 1, the cap 18 is attached to the open upper face of the case 16, and configures part of the case 16.

As illustrated in FIG. 3, the cap 18 includes a lid portion 40 that is slightly bigger than the open upper face of the case 16, and a circular tube portion 42 that is one step narrower than, and extends in circular tube shape from, the lower face of the lid portion 40.

Figure 7:
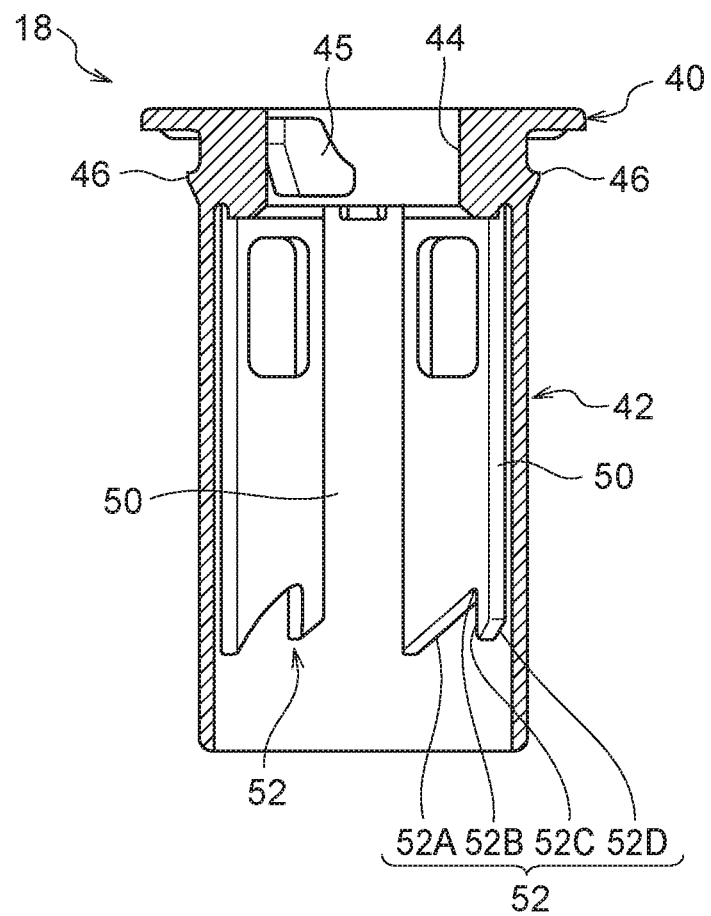
FIG. 7 is a cross-section taken from the side and illustrating a cap of a latch device according to the first exemplary embodiment of the present invention.

As illustrated in FIG. 7, a circular shaped through hole 44 is formed piercing through an inner peripheral portion of the lid portion 40 of the cap 18, from top to bottom. The rod 20 is inserted into the through hole 44. Projections 45, serving as a guide mechanism, are formed so as to jut out from inner peripheral portions of the through hole 44. The circular tube portion 42 of the cap 18 is set with an outer circumference having the internal diameter of the case 16 or smaller, and is inserted into the case 16. Plural elastically deformable anchor claws 46 are formed jutting out in a radial pattern on the outer periphery of the circular tube portion 42 of the cap 18, at locations adjacent to the lid portion 40.

As illustrated in FIG. 3, plural anchor holes 48 are formed in the attachment portion 36 of the case 16, piercing through from the inside to the outside, such that the anchor claws 46 of the cap 18 fit into the anchor holes 48 of the case 16.

Thus, by aligning the circular tube portion 42 of the cap 18 with the open upper face of the case 16 and fitting it therein, the anchor claws 46 are temporarily pushed in, and then the anchor claws 46 elastically fit into the anchor holes 48 so as to fix the cap 18 to the case 16.

As illustrated in FIG. 7, recessed slide grooves 50 are formed in an inner peripheral face of the circular tube portion 42 of the cap 18. The slide grooves 50 retain the slide cam 21 so as be capable of sliding. A plurality of the slide grooves 50 are formed with blind upper end portions, and open lower end portions. Lock grooves 52 are provided at the lower side of the slide grooves 50, as recesses formed in the inner peripheral face of the circular tube portion 42, such that the lock grooves 52 lock the rotation cam 22 so as to render it non-rotatable. The lock grooves 52 are formed in the spacing between adjacent of the slide grooves 50, and are formed as saw tooth shapes along the circumferential direction on the inner peripheral face of the circular tube portion 42.

Figure 4:
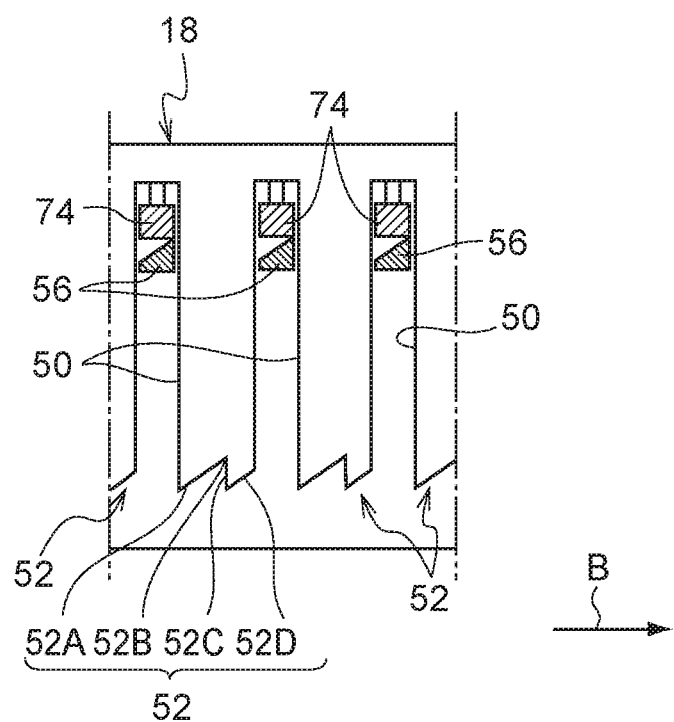
FIG. 4 is an explanatory diagram to explain operation of a lock mechanism of a latch device.
Figure 5:
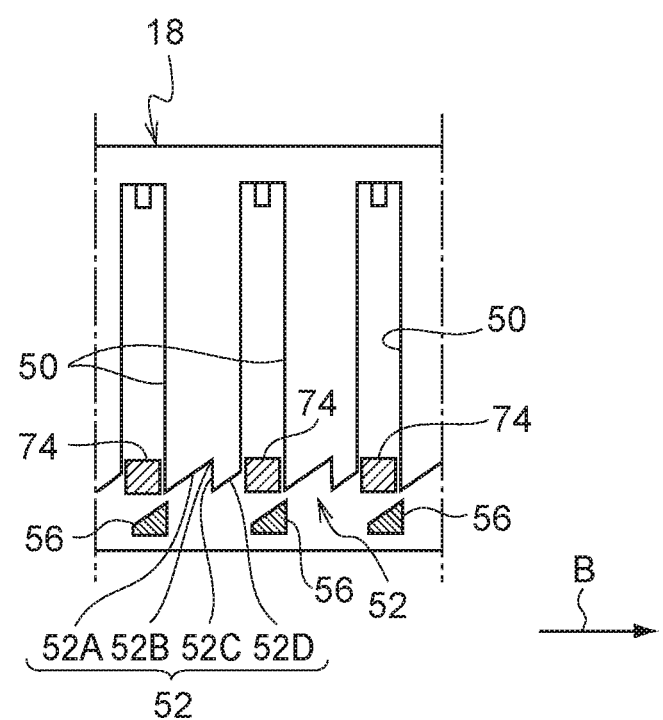
Figure 6:
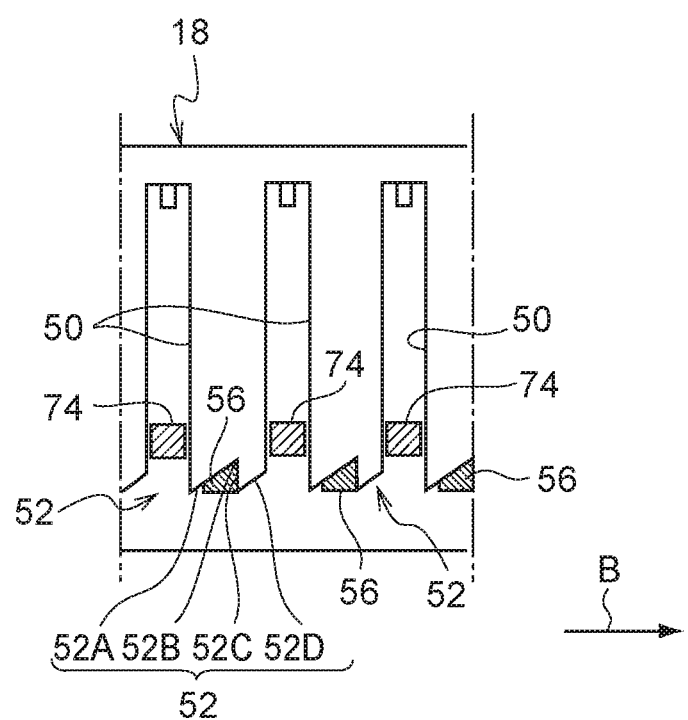
FIG. 6 is an explanatory diagram corresponding to FIG. 4 and illustrating a locked state of a lock mechanism.

As illustrated in FIG. 4 to FIG. 6, with reference to one of the slide grooves 50, the lock grooves 52 each include: a first sloping face portion 52A that slopes upwards (in the push-out direction of the rod) from the slide groove 50 on progression toward the front in a rotation direction of the rotation cam 22 (the direction of arrow B in FIG. 4 to FIG. 6); a lock portion 52B positioned at a slope upper end portion of the first sloping face portion 52A, namely, positioned in front thereof in the rotation direction of the rotation cam 22, with an engagement projection 56 of the rotation cam 22, described later, fitted therein; a vertically ascending vertical portion 52C descending downwards from the lock portion 52B; and an upward sloping second sloping face portion 52D sloping upwards from a lower end portion of the vertical portion 52C, with an slope upper end portion that faces another of the slide grooves 50 positioned in front in the rotation direction of the rotation cam 22.

A slope lower end portion of the first sloping face portion 52A, namely at the rear thereof in the rotation direction of the rotation cam 22, faces the one slide groove 50. The slope angles are the same for the first sloping face portions 52A and the second sloping face portions 52D.

Rod

As illustrated in FIG. 1, the rod 20 is retained inside the case 16 so as to be capable of sliding, and juts out from inside the case 16 to adopt an advanced position, so as to push out the fuel lid 12, as illustrated in FIG. 2.

As illustrated in FIG. 3, the rod 20 is formed in a circular rod shape and includes: the circular plate shaped jutting out portion 64 that is positioned at an intermediate portion in the axial direction and juts outward in radial directions; an upper-side rod section 66 that is positioned at the upper side of the jutting out portion 64 and juts out from inside the case 16 so as to push out the fuel lid 12; and a lower-side rod section 68 that is positioned at the lower side of the jutting out portion 64 and is inserted through the second spring 26. The jutting out portion 64 of the rod 20 abuts a portion in the vicinity of the lower periphery of the through hole 44 in the lid portion 40 of the cap 18, such that movement of the rod 20 in the push-up direction is prevented.

The slide cam 21 having the lower-side rod section 68 inserted therethrough is disposed at the lower side of the jutting out portion 64, i.e. at a position to the rear thereof in the jutting out direction of the rod 20. Fixed-side cams 72 are formed on the lower face of the slide cam 21, and the fixed-side cams 72 mesh with movable-side cams 82 of the rotation cam 22, described later. The fixed-side cams 72 are formed continuously around the circumferential direction on the lower face of the slide cam 21, so as to form obtuse angled saw tooth shapes. Plural sliding projections 74 are formed at the outer periphery of the slide cam 21, jutting out in a radial pattern.

Due to the sliding projections 74 of the slide cam 21 fitting into the slide grooves 50 of the cap 18, and the sliding projections 74 ascending or descending along the slide grooves 50, the slide cam 21 is retained inside the cap 18 so as to be capable of sliding, but not capable of rotating.

As illustrated in FIG. 3, an engagement portion 67 is formed at an upper end of the rod 20, this being a leading end portion of the upper-side rod section 66. Guide grooves 75, serving as a guide mechanism, are formed in a spiral shape at a length direction intermediate portion of the upper-side rod section 66 of the rod 20. The rod 20 rotates about the axial direction thereof when the rod 20 advances or retracts due to sliding movement between the guide grooves 75 and the projections 45, serving as a guide mechanism of the cap 18.

As illustrated in FIG. 2, the engagement portion 67 of the rod 20 has a bar shape extending in a direction orthogonal to the axial direction of the rod 20. Thus, due to the rod 20 rotating about the axial direction thereof when the rod 20 advances or retracts, the engagement portion 67 rotates about the axial direction, so as to be engaged, or disengaged, in an engagement hole 69A of a retainer 69, serving as engaged portion, attached to the back face of the fuel lid 12. The engagement hole 69A is an elongated hole formed in an upper wall portion of a retainer body 69B.

As illustrated in FIG. 8, the retainer body 69B of the retainer 69 is configured with a cap shape, so as to cover an upper portion of the boot 28. An engagement portion 69C is provided so as to extend upward from an upper wall portion of the retainer body 69B, such that the retainer 69 can be attached to the fuel lid 12 by engaging the engagement portion 69C in an attachment hole 13 of the fuel lid 12.

Thus, as illustrated by the double-dotted dashed line in FIG. 2, when the rod 20 is in the locked state, the engagement portion 67 of the rod 20 is engaged with the engagement hole 69A of the retainer 69, so as to retain the fuel lid 12 in the closed state.

As illustrated in FIG. 3, a ring shaped annular groove 76 for attaching the boot 28 is formed in the vicinity of the upper end of the upper-side rod section 66 of the rod 20. A constricted portion 80 is formed at a lower end portion of the lower-side rod section 68 of the rod 20, narrowing so as to fit into a reduced diameter portion 122B of the grommet 122, described later.

The height of the constricted portion 80 of the rod 20 is set so as to be higher than the thickness in the up-down direction of the reduced diameter portion 122B of the grommet 122. This thereby achieves a configuration in which there is a clearance in the height direction of the constricted portion 80 in a state in which the constricted portion 80 is fitted into the reduced diameter portion 122B. As a result, the reduced diameter portion 122B of the grommet 122 is able to ascend or descend up or down by the clearance amount to the constricted portion 80 of the rod 20. On the other hand, the rod 20 is able to ascend or descend up or down with respect to the grommet 122 by the clearance amount.

The amount of clearance is set according to the ascent or descent amount of the rotation cam 22 referred to above as it ascends or descends between a first height position in which the movable-side cams 82 of the rotation cam 22, described later, are meshed with the fixed-side cams 72 of the slide cam 21, and a second height position in which the movable-side cams 82 are disengaged from the fixed-side cams 72.

Sleeve

As illustrated in FIG. 3, the sleeve 120 includes a sleeve main body 120A, and a flange 120B, and the grommet 122 includes a grommet main body 122A, the reduced diameter portion 122B, and slits 122C.

As illustrated in FIG. 1, the lower-side rod section 68 of the rod 20 is inserted through the sleeve 120, and the sleeve 120 is positioned between the rotation cam 22 and the second spring 26. The lower-side rod section 68 of the rod 20 is inserted through the grommet 122, and the grommet 122 is positioned at the lower side of the sleeve 120.

As illustrated in FIG. 3, the sleeve main body 120A of the sleeve 120 and the grommet main body 122A of the grommet 122 are formed in tube shapes, and have the lower-side rod section 68 inserted therethrough. As illustrated in FIG. 1, the flange 120B of the sleeve 120 is positioned at an upper end portion of the sleeve main body 120A, abutting the rotation cam 22, and extending in radial directions both outwards and inwards.

As illustrated in FIG. 1, the reduced diameter portion 122B of the grommet 122 is positioned at a lower end portion of the grommet main body 122A at the opposite side to the upper end portion thereof, and juts out inward in radial directions.

Two pairs of the slits 122C are formed in the diameter direction of the grommet main body 122A, such that the slits 122C divide the lower end portion of the grommet main body 122A into plural divisions. The slits 122C are formed from the end face at the lower side of the grommet main body 122A, upward to partway along the grommet main body 122A.

As illustrated in FIG. 1, the first spring 25 is positioned between the grommet 122 and the sleeve 120, is compressed between the grommet main body 122A of the grommet 122 and the inner peripheral portion of the flange 120B of the sleeve 120, and biases the sleeve 120 and the grommet 122 in the direction away from each other.

Rod Biasing Member

As illustrated in FIG. 1, the second spring 26 is positioned between the case 16 and the sleeve 120, is compressed between an outer peripheral portion of the flange portion 120B of the sleeve 120 and the bottom of the case 16, and, through the rotation cam 22 and the slide cam 21, biases the rod 20 in the jutting out direction, pushing the rod 20 out from inside the case 16.

Lock Mechanism

As illustrated in FIG. 3, a lock mechanism is configured by a rotation cam type mechanism provided with the slide cam 21 and the rotation cam 22. The lock mechanism is positioned between the case 16 and the rod 20, so as to lock the rod 20 in a position retracted in the case 16 against the biasing force of the second spring 26. The rotation cam 22 is supported on the lower-side rod section 68 of the rod 20 so as to be capable of rotating and also capable of sliding in the axial direction. The rotation cam 22 includes the movable-side cams 82 that mesh with the fixed-side cams 72 of the slide cam 21, and that are disengaged and imparted with a rotation force in one direction by sliding of the rod 20.

The rotation cam 22 is formed in a donut shape, and includes: a central hole 86 that pierces through the center in the up-down direction and has the lower-side rod section 68 of the rod 20 inserted therethrough; and the movable-side cams 82 that are formed on the upper face of the rotation cam 22, that engage with the fixed-side cams 72 of the slide cam 21, and that are disengaged and imparted with biasing force in one direction by sliding of the rod 20. The movable-side cams 82 are formed in complementary shapes to the fixed-side cams 72 of the slide cam 21, and are formed continuously around the circumferential direction on the upper face of the rotation cam 22, so as to form obtuse angled saw tooth shapes. The plural engagement projections 56 are formed in a radial pattern around the outer periphery of the rotation cam 22.

As illustrated in FIG. 4 to FIG. 6, the engagement projections 56 of the rotation cam 22 are each formed as a right trapezoid having an inclined face as the upper face in plan view, so as to fit into the lock portion 52B of the respective lock groove 52 of the cap 18. The inclined faces of the trapezoid shaped engagement projections 56 of the rotation cam 22 each have an angle of inclination that matches the angles of inclination of the first sloping face portion 52A and the second sloping face portion 52D of the respective lock groove 52.

The left-right direction lateral width of the engagement projections 56 of the rotation cam 22 is set to the left-right direction groove width of the slide grooves 50 of the cap 18 or smaller, so as to be able to slide in the slide grooves 50.

Boot

As illustrated in FIG. 3, the boot 28 covers the upper-side rod section 66 that juts out from the case 16, is extendable and retractable, and is provided between the engagement portion 67 of the rod 20 and the case 16. The boot 28 is formed in a hollow concertina shape, with open upper face and lower face. As illustrated in FIG. 1, a ring shaped recess 96 is formed in a ring shape jutting out in radial directions toward the inside on the inner peripheral face at the open lower face of the boot 28, and the flange 34 of the case 16 fits into the ring shaped recess 96.

A ring shaped ribbed portion 97 is formed in ring shapes jutting out in radial directions toward the inside on the inner peripheral face at the open upper face of the boot 28. The ring shaped ribbed portion 97 of the boot 28 sandwiches a tube shaped collar 100, serving as a slide resistance reduction member, provided at the boot 28 and a tube shaped seal 102, serving as a slide resistance reduction member, provided at the rod 20 so as to fit into the annular groove 76 of the rod 20, such that the rod 20 rotates smoothly about the axial direction thereof with respect to the boot 28 during advancing and retracting of the rod 20.

Thus, a configuration is achieved such that foreign objects can be prevented from adhering to the guide grooves 75 and the projections 45, due to the upper-side rod section 66 of the rod 20 being covered by the boot 28 provided between the engagement portion 67 of the rod 20 and the case 16. Moreover, configuration is such that the slide resistance between the rod 20 and the boot 28 is reduced, due to the collar 100 and the seal 102 provided between the rod 20 and the boot 28.

Operation and Advantageous Effects

Explanation follows regarding operation and advantageous effects of the latch device 10 of the present exemplary embodiment.

As illustrated in FIG. 2, in an assembled state, the latch device 10 is fixed to the inner panel 14 by the case 16 aligning with and fitting into the attachment hole 32 of the inner panel 14. In a closed state of the fuel lid 12, the latch device 10 is locked while the rod 20 is in a contracted lock state.

When the fuel lid 12 in a closed state is pushed in, the rod 20 of the latch device 10 is pressed into the case 16, and the locked state is released. As a result, the rod 20 is jutted out from inside the case 16 due to the recovery force from compression of the second spring 26, pushes the fuel lid 12 open, and releases engagement between the engagement portion 67 of the rod 20 and the engagement hole 69A of the retainer 69. This thereby enables the pushed open fuel lid 12 to be easily opened by hand.

To explain more specifically, in the contracted locked state of the rod 20, as illustrated in FIG. 6, the engagement projections 56 of the rotation cam 22 engage with the lock grooves 52 of the cap 18, and fit into the lock portions 52B. When, from this state, the rod 20 is then pressed into the case 16, the rotation cam 22 descends together with the slide cam 21, pressed by the jutting out portion 64 of the rod 20. Therefore, as illustrated in FIG. 5, the engagement projections 56 of the rotation cam 22 are disengaged from the lock portions 52B of the cap 18. When this occurs, meshing between the fixed-side cams 72 of the slide cam 21 and the movable-side cams 82 of the rotation cam 22 is disengaged, and the rotation cam 22 rotates in the arrow B direction. Then, when the force pressing in the rod 20 is released, the rotation cam 22 is pushed up by recovery force from the compressed second spring 26. When this occurs, the engagement projections 56 of the rotation cam 22 abut the second sloping face portions 52D of the cap 18. The engagement projections 56 accordingly ascend while make sliding contact with the second sloping face portions 52D, and, as illustrated in FIG. 4, fit from the sloping face upper end portions of the second sloping face portions 52D into the slide grooves 50.

As illustrated in FIG. 4, when the engagement projections 56 fit into the slide grooves 50, the engagement projections 56 are able to ascend along the slide grooves 50. The jutting out portion 64 of the rod 20 is accordingly pressed up, through the grommet 122, by recovery force from compression of the compressed second spring 26, and the rod 20 extends so as to jut out from the case 16.

On the other hand, when the opened fuel lid 12 is closed by hand, the extended rod 20 of the latch device 10 is pressed in toward the case 16 against the biasing force of the second spring 26, and the engagement projections 56 of the rotation cam 22 descend along the slide grooves 50.

Next, when the rod 20 is pressed in further toward the case 16 against the biasing force of the second spring 26, the engagement projections 56 of the rotation cam 22 descend along the slide grooves 50, the engagement projections 56 move out past the open lower end of the slide grooves 50, and the rotation cam 22 is then able to rotate. Thus, due to disengaging the meshing between the fixed-side cams 72 and the movable-side cams 82, the rotation cam 22 rotates in the direction of arrow B in FIG. 5, and moves from the lower side of the slide grooves 50 toward the first sloping face portions 52A of the lock grooves 52.

Next, when the force pressing in the rod 20 is released, the rotation cam 22 is pressed up by the recovery forces from compression of the first spring 25 and the second spring 26. When this occurs, the engagement projections 56 abut the first sloping face portions 52A. Thereby, as illustrated in FIG. 6, the engagement projections 56 ascend while making sliding contact with the first sloping face portions 52A, fit into the lock portions 52B, and return again to a locked state.

The rod 20 rotates about the axial direction thereof during advancing or retracting of the rod 20 due to the guide grooves 75 provided at the rod 20 and the projections 45 provided at the cap 18. In the locked state, the engagement portion 67 provided at the leading end portion of the rod 20 engages with the engagement hole 69A of the retainer 69, serving as an engagement portion attached to the back face of the fuel lid 12, as illustrated by the double-dotted dashed line in FIG. 2, thereby enabling the fuel lid fuel lid 12 to be retained in the closed state.

Thus, in the latch device 10 of the present exemplary embodiment, the second spring 26 is elastically compressed between the inside of the case 16 and the sleeve 120, and, through the sleeve 120, biases the rod 20 in the jutting out direction. In the locked state as illustrated in FIG. 2, the biasing force of the second spring 26 (high load) neither acts directly on the engagement portion 67 and the guide grooves 75 of the rod 20, nor on the projections 45 of the cap 18. As a result, a drop in the durability of the latch device due to high load can be prevented.

Moreover, in the present exemplary embodiment, the lock mechanism is a rotation cam type lock mechanism configured as described above, with switching between locking and unlocking achieved by the rotation cam being operated by pressing the rod 20 in. Switching between locking and unlocking is accordingly reliably achieved.

Moreover, in the present exemplary embodiment, foreign objects can be prevented from adhering to the guide grooves 75 and the projections 45, due to the upper-side rod section 66 of the rod 20 being covered by the boot 28 provided between the engagement portion 67 and the case 16.

Moreover, in the present exemplary embodiment, the slide resistance between the rod 20 and the boot 28 is reduced, due to the collar 100 and the seal 102 provided between the rod 20 and the boot 28. The rotatability of the rod 20 with respect to the boot 28 is improved as a result.

Other Exemplary Embodiments

Although the present invention has been explained in detail for particular exemplary embodiments as described above, the present invention is not limited to the above exemplary embodiments, and it will be clear to a person of ordinary skill in the art that various other exemplary embodiments are possible within the range of the present invention. For example, the rod biasing member and lock mechanism are not limited to the configurations of the above exemplary embodiments.

Moreover, although in each of the above exemplary embodiments, the engagement portion 67 formed at the upper end of the rod 20 is configured so as to engage with the engagement hole 69A of the retainer 69, serving as an engaged portion attached to the back face of the fuel lid 12, instead of this configuration, the engagement hole of the engaged portion may be configured by being formed on the back face of the fuel lid 12. The engaged portion is also not limited to an engagement hole, and another configuration may be adopted.

Moreover, although in each of the above exemplary embodiments, the projections 45 serving as a guide mechanism are provided at the cap 18 of the case 16, and the spiral shaped guide grooves 75 serving as the guide mechanism are formed to the rod 20, instead of this configuration, a configuration may be adopted in which the guide grooves 75 serving as a guide mechanism are formed to the cap 18, and the projections 45 serving as a guide mechanism are provided at the rod 20. Moreover, the guide mechanism is not limited to the projections 45 and the spiral shaped guide grooves 75, and another configuration may be adopted.

Moreover, although in each of the above exemplary embodiments, the tube shaped collar 100, and the tube shaped seal 102 are used as slide resistance reduction members, the slide resistance reduction member is not limited to the tube shaped collar 100 and the tube shaped seal 102, and another configuration may be adopted.

The latch device 10 of the present invention in each of the above exemplary embodiments is attached to the vehicle body inner panel 14, serving as a second member, facing the fuel lid 12, serving as a first member. However, the latch device of the present invention may be attached to another second member other than a vehicle body inner panel, facing another first member other than a fuel lid.

The entire contents of the disclosure of Japanese Patent Application No. 2014-003481 filed Jan. 10, 2014, is incorporated by reference in the present specification.

All publications, patent applications and technical standards mentioned in the present specification are incorporated by reference in the present specification to the same extent as if the individual publication, patent application, or technical standard was specifically and individually indicated to be incorporated by reference.

The invention claimed is:

1. A latch device, comprising:
   a tube shaped case that is fixed at a side of a second member that faces a first member;
   a rod that is retained inside the case so as to be capable of sliding, and that juts out from inside the case to adopt an advanced position pushing out the first member;
   a rod biasing member that is positioned between the case and the rod, and that is compressed under elastic deformation inside the case, so as to bias the rod in a jutting out direction pushing the rod out from inside the case;
   a lock mechanism including:
     a slide cam that moves together with the rod in the jutting out direction, and
     a rotation cam that is provided at a rear side of the slide cam in the jutting out direction and that is capable of relative rotation with respect to the slide cam about an axis of the rod,
     with the lock mechanism positioned between the case and the rod, and locking the rod in a retracted position in the case due to the rotation cam engaging with the slide cam and rotating due to the rod being pressed in against a biasing force of the rod biasing member;
   a guide mechanism that is provided between the rod and the case, and is for rotating the rod about an axial direction of the rod when the rod is advancing or retracting; and
   an engagement portion that is provided at the rod, that is capable of disengaging from an engaged portion of the first member due to the rod rotating about the axial direction thereof, and that engages with the engaged portion when the rod has been locked.

2. The latch device of claim 1, wherein the lock mechanism further includes:
   a jutting out portion that is positioned partway along an axial direction of the rod and that juts out in a radial direction toward an outer side;
   a lower-side rod section positioned at the rear side in the jutting out direction with the jutting out portion as a boundary, so as to be capable of sliding in the axial direction, the lower-side rod section supporting the slide cam, and supporting the rotation cam at the rear side of the slide cam in the jutting out direction such that the rotation cam is capable of rotating and capable of sliding in the axial direction, and the rotation cam meshing with the slide cam, and disengaging and being imparted with a rotation force in one direction by sliding of the rod;
   a slide groove that is positioned at one of an outer peripheral face of the slide cam or an inner peripheral face of the case, and that extends along a slide direction of the rod,
   a slide projection that is positioned at another of the outer peripheral face of the slide cam or the inner peripheral face of the case, and that prevents rotation of the slide cam with respect to the case due to relative sliding of the slide projection inside the slide groove due to sliding of the slide cam;
   an engagement projection that juts out from one of an outer peripheral face of the rotation cam or the inner peripheral face of the case;
   a lock groove that is positioned at another of the outer peripheral face of the rotation cam or the inner peripheral face of the case, that includes a lock portion into which the engagement projection fits, the engagement projection that has been fitted into the lock portion being capable of disengaging from the lock portion by the rotation cam rotating due to the rotation cam disengaging from the slide cam;
   a sleeve that is supported at a rear side of the rotation cam in the jutting out direction by the lower-side rod section so as to be capable of rotating and capable of sliding in the axial direction, and that is capable of abutting the rotation cam; and a grommet that is disposed at a rear side of the sleeve in the jutting out direction, that is inserted at the lower-side rod section, and that limits movement of the rod in the slide direction.

3. The latch device of claim 2, further comprising a boot that is provided between the engagement portion and the case, and that covers the rod.

4. The latch device of claim 2, wherein the second member is a vehicle body, and the first member is a fuel lid attached to the vehicle body so as to be capable of rotating in opening and closing directions.

5. The latch device of claim 3, further comprising a slide resistance reduction member that is provided between the rod and the boot to reduce slide resistance between the rod and the boot.

6. The latch device of claim 3, wherein the second member is a vehicle body, and the first member is a fuel lid attached to the vehicle body so as to be capable of rotating in opening and closing directions.

7. The latch device of claim 5, wherein the second member is a vehicle body, and the first member is a fuel lid attached to the vehicle body so as to be capable of rotating in opening and closing directions.

8. The latch device of claim 1, further comprising a boot that is provided between the engagement portion and the case, and that covers the rod.

9. The latch device of claim 8, further comprising a slide resistance reduction member that is provided between the rod and the boot to reduce slide resistance between the rod and the boot.

10. The latch device of claim 8, wherein the second member is a vehicle body, and the first member is a fuel lid attached to the vehicle body so as to be capable of rotating in opening and closing directions.

11. The latch device of claim 9, wherein the second member is a vehicle body, and the first member is a fuel lid attached to the vehicle body so as to be capable of rotating in opening and closing directions.

12. The latch device of claim 1, wherein the second member is a vehicle body, and the first member is a fuel lid attached to the vehicle body so as to be capable of rotating in opening and closing directions.

* * * * *